(12) United States Patent
Raval et al.

(10) Patent No.: US 8,957,607 B2
(45) Date of Patent: Feb. 17, 2015

(54) DC-DC CONVERTER USING HYSTERETIC CONTROL AND ASSOCIATED METHODS

(75) Inventors: Pranav Raval, Nashua, NH (US); Gregory Szczeszynski, Hollis, NH (US); Bassem Alnahas, Manchester, NH (US)

(73) Assignee: Allergo Microsystems, LLC, Worcester, MA (US)

( * ) Notice: Subject to any disclaimer, the term of this patent is extended or adjusted under 35 U.S.C. 154(b) by 111 days.

(21) Appl. No.: 13/591,570

(22) Filed: Aug. 22, 2012

(65) Prior Publication Data
US 2014/0055045 A1    Feb. 27, 2014

(51) Int. Cl.
H05B 41/36    (2006.01)

(52) U.S. Cl.
USPC ........... 315/360; 315/224; 315/288; 315/297; 383/21.07

(58) Field of Classification Search
CPC .......... H05B 33/0815; H05B 41/3925; H02M 3/156; H02M 3/33523
USPC ................. 323/288; 315/297, 224; 363/21.07
See application file for complete search history.

(56) References Cited

U.S. PATENT DOCUMENTS

| | | | |
|---|---|---|---|
| 4,739,226 A | 4/1988 | Murata | |
| 6,222,385 B1 | 4/2001 | Kang | |
| 6,621,235 B2 | 9/2003 | Chang | |
| 6,636,104 B2 | 10/2003 | Henry | |
| 6,690,146 B2 | 2/2004 | Burgyan et al. | |
| 6,822,403 B2 | 11/2004 | Horiuchi et al. | |
| 6,930,679 B2 | 8/2005 | Wu et al. | |
| 6,963,175 B2 | 11/2005 | Archenhold et al. | |
| 7,116,086 B2 | 10/2006 | Burgyan et al. | |
| 7,129,679 B2 | 10/2006 | Inaba et al. | |
| 7,148,632 B2 | 12/2006 | Berman et al. | |
| 7,235,954 B2 | 6/2007 | Murakami | |
| 7,291,989 B2 | 11/2007 | Namba et al. | |
| 7,307,614 B2 | 12/2007 | Vinn | |
| 7,317,403 B2 | 1/2008 | Grootes et al. | |
| 7,375,472 B2 | 5/2008 | Wong et al. | |
| 7,466,082 B1 | 12/2008 | Snyder et al. | |

(Continued)

FOREIGN PATENT DOCUMENTS

| | | |
|---|---|---|
| EP | 1 079 667 A2 | 2/2001 |
| EP | 1 079 667 A3 | 2/2001 |

(Continued)

OTHER PUBLICATIONS

PCT Search Report of the ISA for PCT/US2013/053165 dated Feb. 13, 2013.

(Continued)

*Primary Examiner* — Douglas W Owens
*Assistant Examiner* — Syed M Kaiser
(74) *Attorney, Agent, or Firm* — Daly, Crowley, Mofford & Durkee, LLP (57) ABSTRACT

A control circuit used to control a DC-DC converter includes a duty cycle control unit to control a duty cycle of the DC-DC converter and a hysteretic control unit to maintain a voltage at an output of the DC-DC converter within a narrow range during certain operational time periods. The hysteretic control unit may maintain the converter output voltage within the range by alternately enabling and disabling the duty cycle control unit based on feedback from the DC-DC converter output. In at least one embodiment, the control circuit is used within LED driver circuitry for driving a plurality of LED channels.

27 Claims, 6 Drawing Sheets

(56) References Cited

U.S. PATENT DOCUMENTS

| | | | |
|---|---|---|---|
| 7,479,743 B2 | 1/2009 | Namba et al. | |
| 7,482,765 B2 | 1/2009 | Ito et al. | |
| 7,528,551 B2 | 5/2009 | Ball | |
| 7,675,245 B2 | 3/2010 | Szczeszynski et al. | |
| 7,675,246 B2 | 3/2010 | Chiang et al. | |
| 7,928,670 B2 | 4/2011 | Chen et al. | |
| 7,999,487 B2 | 8/2011 | Szczeszynski | |
| 8,169,161 B2 | 5/2012 | Szczeszynski et al. | |
| 8,274,238 B2 | 9/2012 | Szczeszynski et al. | |
| 8,482,225 B2 | 7/2013 | Szczeszynski | |
| 8,653,756 B2 | 2/2014 | Szczeszynski et al. | |
| 2004/0051478 A1 | 3/2004 | Otake et al. | |
| 2004/0080273 A1 | 4/2004 | Ito et al. | |
| 2004/0251854 A1 | 12/2004 | Matsuda et al. | |
| 2004/0251942 A1 | 12/2004 | Chiu et al. | |
| 2005/0088207 A1 | 4/2005 | Rader et al. | |
| 2005/0104542 A1 | 5/2005 | Ito et al. | |
| 2005/0110469 A1 | 5/2005 | Inaba et al. | |
| 2005/0156540 A1 | 7/2005 | Ball | |
| 2005/0243022 A1 | 11/2005 | Negru | |
| 2005/0243041 A1 | 11/2005 | Vinn | |
| 2006/0022916 A1 | 2/2006 | Aiello | |
| 2006/0028147 A1 | 2/2006 | Shinmen et al. | |
| 2006/0114954 A1 | 6/2006 | Wong et al. | |
| 2006/0125320 A1 | 6/2006 | Namba et al. | |
| 2006/0139299 A1 | 6/2006 | Tsuchiya | |
| 2006/0170287 A1 | 8/2006 | Ito et al. | |
| 2006/0250824 A1 | 11/2006 | Wekhande et al. | |
| 2007/0120506 A1 | 5/2007 | Grant | |
| 2007/0182701 A1 | 8/2007 | Kim et al. | |
| 2007/0267978 A1 | 11/2007 | Shteynberg et al. | |
| 2008/0048573 A1 | 2/2008 | Ferentz et al. | |
| 2008/0144236 A1 | 6/2008 | Chiang et al. | |
| 2008/0164828 A1 | 7/2008 | Szczeszynski et al. | |
| 2009/0021384 A1 | 1/2009 | Jacubovski et al. | |
| 2009/0195183 A1 | 8/2009 | Yang | |
| 2009/0289559 A1 | 11/2009 | Tanaka et al. | |
| 2010/0052552 A1 | 3/2010 | Kimura | |
| 2010/0060177 A1 | 3/2010 | Takata et al. | |
| 2010/0066255 A1 | 3/2010 | Roberts | |
| 2010/0072922 A1* | 3/2010 | Szczeszynski et al. | 315/297 |
| 2010/0109550 A1 | 5/2010 | Huda et al. | |
| 2010/0164581 A1 | 7/2010 | Zhang et al. | |
| 2010/0181939 A1 | 7/2010 | Szczeszynski et al. | |
| 2010/0207547 A1 | 8/2010 | Kuroki et al. | |
| 2010/0259177 A1 | 10/2010 | Mednik et al. | |
| 2010/0327835 A1 | 12/2010 | Archibald | |
| 2011/0026277 A1* | 2/2011 | Strijker | 363/21.07 |
| 2011/0032008 A1 | 2/2011 | Zhao et al. | |
| 2011/0062929 A1 | 3/2011 | Strydom et al. | |
| 2011/0204947 A1 | 8/2011 | Qiu et al. | |
| 2011/0234122 A1 | 9/2011 | Yu et al. | |
| 2011/0298384 A1 | 12/2011 | Tanigawa et al. | |
| 2012/0133299 A1 | 5/2012 | Capodivacca et al. | |
| 2012/0146541 A1 | 6/2012 | Szczeszynski et al. | |
| 2012/0181939 A1 | 7/2012 | Szczeszynski et al. | |
| 2013/0009556 A1 | 1/2013 | Szczeszynski et al. | |
| 2013/0009557 A1 | 1/2013 | Szczeszynski | |
| 2013/0162152 A1 | 6/2013 | Lee et al. | |
| 2013/0207632 A1* | 8/2013 | Thandi et al. | 323/288 |

FOREIGN PATENT DOCUMENTS

| | | |
|---|---|---|
| EP | 1 499 165 A2 | 1/2005 |
| JP | 3-196280 | 8/1991 |
| JP | H06-044807 | 2/1994 |
| JP | H11-507750 A | 7/1999 |
| JP | 2002-257871 A | 9/2002 |
| JP | 2002-281345 A | 9/2002 |
| JP | 2003-063062 | 3/2003 |
| JP | 2003-215534 | 7/2003 |
| JP | 2004-134147 | 4/2004 |
| JP | 2004-134147 A | 4/2004 |
| JP | 2005-116738 A | 4/2005 |
| JP | 2006-116738 | 4/2005 |
| JP | 2006-005381 | 1/2006 |
| JP | 3755770 B2 | 3/2006 |
| JP | 2006-158186 A | 6/2006 |
| JP | 2006-185942 | 7/2006 |
| JP | 2006-521659 A | 9/2006 |
| JP | 2006-318326 A | 11/2006 |
| JP | 2005-122979 | 5/2007 |
| JP | 2006-129862 | 5/2007 |
| JP | 2007-120506 | 5/2007 |
| JP | 2007-129862 | 5/2007 |
| JP | 2008-311602 A | 12/2008 |
| WO | WO 00/13310 | 3/2000 |
| WO | WO 02/03087 A1 | 1/2002 |
| WO | WO 2007/043389 A1 | 4/2007 |
| WO | WO 2007/096868 A1 | 8/2007 |
| WO | WO 2007/126630 A2 | 11/2007 |
| WO | WO 2007/126630 A3 | 11/2007 |
| WO | WO 2008/086050 A2 | 7/2008 |
| WO | WO 2008/086050 A3 | 7/2008 |
| WO | WO 2009/064682 A2 | 5/2009 |
| WO | WO 2009/064682 A3 | 5/2009 |
| WO | WO 2009/157763 A2 | 12/2009 |
| WO | WO 2009/157763 A3 | 12/2009 |
| WO | WO 2010/000475 A1 | 1/2010 |
| WO | WO 2013/006272 A1 | 1/2013 |

OTHER PUBLICATIONS

PCT Written Opinion of the ISA for PCT/US2013/053165 dated Feb. 13, 2013.

Letter from Yuasa and Hara dated Mar. 14, 2014; for Japanese Pat. App. No. 2010-534111; 1 page.

Japanese Notice of Allowance received Mar. 14, 2014; for Japanese Pat. App. No. 2010-534111; 3 pages.

Raval, et al.; U.S. Appl. No. 13/752,904, filed Jan. 29, 2013.

Raval, et al.; U.S. Appl. No. 13/951,564, filed Aug. 22, 2012.

Japanese Notice of Rejection; dated Feb. 21, 2013; for JP Pat. App. No. 2010-534111; 4 pages.

Taiwan Office Action and Search Report (in Taiwanese); received Apr. 30, 2013 for TW Pat. App. No. 097144152; 7 pages.

Taiwan Office Action and Search Report (in English); received Apr. 30, 2013 for TW Pat. App. No. 097144152; 8 pages.

PCT Search Report and Written Opinion of the ISA for PCT/US2012/043275 dated Sep. 4, 2012.

"Integrated 8-Channel LED Drivers with Switch-Mode Boost and SEPIC Controller," MAXIM; MAX 16807/MAX16808; #19-6055; Oct. 2006; pp. 1-21.

"Charge-Pump and Step-Up DC-DC Converter Solutions for Powering White LEDs in Series or Parallel Connections;" Dallas Semiconductor MAXIM; Apr. 23, 2002; 15 pages.

"White LED Driver IC;" NPC Nippon Precision Circuits, Inc.; SM8132A; May 2005; pp. 1-18.

"WLED Backlight Drivers with True Shutdown and OVP;" A8432 and A8433: Allegro MicroSystems, Inc. Concept Data Sheet; Jan. 25, 2006; 6 pages.

Allegro Microsystems, Inc., Data Sheet A8500; "Flexible WLED/RGB Backlight Driver for Medium Size LCDs;" Jan. 2006-2010; pp. 1-16.

Allegro Microsystems, Inc., Data Sheet A8501; "2 MHz, 4 Channel × 100 mA WLED/RGB Driver with Output Disconnect;" Jan. 2008-2010; pp. 1-24.

Allegro Microsystems, Inc., Data Sheet A8502; "Wide Input Voltage Range, High Efficiency Fault Tolerant LED Driver;" Jan. 16, 2012; pp. 1-35.

Allegro Microsystems, Inc., Data Sheet A8503; "High Efficiency 6-Channel, 2 MHz, WLED/RGB Driver for Medium Displays, with Integrated 55 V Power Switch;" Jan. 2009; pp. 1-17.

Allegro Microsystems, Inc., Data Sheet A8504, "WLED/RGB Backlight Driver for Medium Size LCDs;" Jan. 2007-2009; pp. 1-18.

Allegro Microsystems Inc., Data Sheet A8508; "Wide Input Voltage Range, High Efficiency 8-Channel Fault Tolerant LED Driver;" Jul. 9, 2012; pp. 1-28.

(56) References Cited

OTHER PUBLICATIONS

Bakker et al.; "A CMOS Nested-Chopper Instrumentation Amplifier with 100-nV Offset;" IEEE Journal of Solid State Circuits; vol. 35, No. 12; Dec. 2000; pp. 1877-1883.
Burkhart et al.; "A Monolithically Integrated 128 LED-Driver and its Application;" IEEE Transactions on Consumer Electronics; vol. CE-32, No. 1; Feb. 1986; pp. 26-31.
MAXIM Data Sheet; MAX1570; "White LED Current Regulator with 1x/1.5x High-Efficiency Charge Pump;" #19-2526; Jul. 2002; pp. 1-12.
MAXIM Data Sheet; MAX1574; "180mA, 1x/2x, White LED Charge Pump in 3mm × 3mm TDFN;" #19-3117; Dec. 2003; pp. 1-9.
MAXIM Data Sheet; MAX1576; "480mA White LED 1x/1.5x./2x Charge Pump for Backlighting and Camera Flash;" #19-3326; Aug. 2005; pp. 1-14.
MAXIM Data Sheet; MAX16807/MAX16808, "Integrated 8-Channel LED Drivers with Switch-Mode Boost and SEPIC Controller", #19-0655, Oct. 2006, pp. 1-21.
Raval, et al.; "LED Driver Having Priority Queue to Track Dominant LED Channel;" U.S. Appl. No. 13/591,564, filed Aug. 22, 2012.
ROHM, Data Sheet BD6066GU, Silicon Monolithic Integrated Circuit, Apr. 2005, pp. 1-6.
Szczeszynski et al.; U.S. Appl. No. 12/267,645, filed Nov. 10, 2008; Entitled: "Electronic Circuits for Driving Series Connected Light Emitting Diode Strings".
Szczeszynski; "Electronic Circuits and Techniques for Improving a Short Duty Cycle Behavior of a DC-DC Converter Driving a Load;" U.S. Appl. No. 13/177,070, filed Jul. 6, 2011.
Witt; Linear Technology; Design Notes; "Short-Circuit Protection for Boost Regulators;" Jan. 1997, 2 pages.
Partial PCT Search Report received with Invitation to Pay Additional Fees in PCT/US2008/050026 dated Jun. 16, 2008, 5 pages.
PCT International Preliminary Report on Patentability of the ISA dated May 27, 2010 for PCT/2008/082934; 14 pages.
PCT Search Report and Written Opinion for the ISA of PCT/US2008/082934 mailed Dec. 15, 2009, 17 pages.
PCT Search Report and Written Opinion of the ISA for PCT/US2008/050026 dated Aug. 29, 2008, 17 pages.
U.S. Pat. No. 7,999,487 issued on Aug. 16, 2011 Part 1 of 5; 400 pages.
U.S. Pat. No. 7,999,487 issued on Aug. 16, 2011 Part 2 of 5; 400 pages.
U.S. Pat. No. 7,999,487 issued on Aug. 16, 2011 Part 3 of 5; 400 pages.
U.S. Pat. No. 7,999,487 issued on Aug. 16, 2011 Part 4 of 5; 400 pages.
U.S. Pat. No. 7,999,487 issued on Aug. 16, 2011 Part 5 of 5; 50 pages.
U.S. Pat. No. 8,169,161 issued on May 11, 2012 Part 1 of 5; 400 pages.
U.S. Pat. No. 8,169,161 issued on May 11, 2012 Part 2 of 5; 400 pages.
U.S. Pat. No. 8,169,161 issued on May 11, 2012 Part 3 of 5; 400 pages.
U.S. Pat. No. 8,169,161 issued on May 11, 2012 Part 4 of 5; 400 pages.
U.S. Pat. No. 8,169,161 issued on May 11, 2012 Part 5 of 5; 176 pages.
Notice of Allowance; dated Oct. 9, 2013; for U.S. Appl. No. 13/428,654; 24 pages.
Letter to Yuasa and Hara; dated Oct. 4, 2013; for Japanese Pat. App. No. 2010-534111; 3 pages.
Letter from Yuasa and Hara; dated Oct. 21, 2013; for Japanese Pat. App. No. 2010-534111; 1 page.
Japanese Response filed Oct. 4, 2013; for Japanese Pat. App. No. 2010-534111; 4 pages.
PCT Search Report of the ISA for PCT/US2013/053162 dated Oct. 8, 2013.
Written Opinion of the ISA for PCT/US2013/053162 dated Oct. 8, 2013.
U.S. Appl. No. 13/591,564, filed Aug. 22, 2012, Raval et al.
U.S. Appl. No. 13/752,904, filed Jan. 29, 2013, Raval et al.
U.S. Appl. No. 14/149,167, filed Jan. 1 2014, Szczeszynski et al.
Allegro Microsystems, Inc. A8432 and A8433 Data Sheets; WLED Backlight Drivers with True Shutdown and OVP; Jan. 25, 2005; pp. 1-6.
Linear Technology; Design Note 154; Short-Circuit Protection for Boost Regulators; 1997; pp. 1-2.
Nippon Precision Circuits, Inc.; SM8132A; "White LED Driver IC;" Nippon Precision Circuits, Inc.; May 2005; pp. 1-18.
"WLED Backlight Drivers with True Shutdown and OVP;" A8432 and A8433: Allegro MicroSystems, Inc. Concept Data Sheet; Jan. 25, 2005; 6 pages.
Office Action dated Sep. 1, 2011; for U.S. Appl. No. 12/267,645; 24 pages.
Response filed Nov. 14, 2011; to U.S. Appl. No. 12/267,645; 7 pages.
Notice of Allowance dated Jan. 11, 2012; for U.S. Appl. No. 12/267,645; 10 pages.
312 Amendment filed Mar. 7, 2012; for U.S. Appl. No. 12/267,645; 4 pages.
Response to 312 Amendment filed Mar. 7, 2012; for U.S. Appl. No. 12/267,645; 2 pages.
Office Action; dated Apr. 25, 2013; for U.S. Appl. No. 12/966,139; 20 pages.
Response to Office Action filed Jul. 24, 2013; to Office Action; dated Apr. 25, 2013; for U.S. Appl. No. 12/966,139; 11 pages.
Notice of Allowance dated Sep. 17, 2013; for U.S. Appl. No. 12/966,139; 16 pages.
Request for Continued Examination dated Oct. 29, 2013; for U.S. Appl. No. 12/966,139; 3 pages.
Notice of Allowance dated Nov. 12, 2013; for U.S. Appl. No. 12/966,139; 12 pages.
Response to Taiwanese Office Action (with Claims in English); filed Jul. 11, 2013; for TW Pat. App. No. 097144152; 7 pages.
JP Response to Office Action (with English translation of claims); filed May 20, 2013; for JP Pat. App. No. 2010-534111; 13 pages.
Letter from Yuasa and Hara; dated Jul. 8, 2013; for JP Pat. App. No. 2010-534111; 2 pages.
PCT Partial Search Report and Invitation to Pay Additional Fees dated Jun. 16, 2008 for PCT/US2008/050026.
PCT Search Report and Written Opinion of the ISA for PCT/US2011/062500 dated Apr. 3, 2012.
PCT Search Report and the Written Opinion of the ISA dated Oct. 1, 2012; for PCT Pat. App. No. PCT/US2012/044149; 11 pages.
U.S. Appl. No. 11/619,675, filed Jan. 4, 2007 Part 1 of 2; pp. 1-305.
U.S. Appl. No. 11/619,675, filed Jan. 4, 2007 Part 2 of 2; pp. 1-313.
U.S. Pat. No. 7,675,245; Timeframe Dec. 14, 2009-Nov. 29, 2010; 198 pages.
U.S. Pat. No. 8,274,238; Part 1 of 6; 400 pages.
U.S. Pat. No. 8,274,238; Part 2 of 6; 400 pages.
U.S. Pat. No. 8,274,238; Part 3 of 6; 400 pages.
U.S. Pat. No. 8,274,238; Part 4 of 6; 400 pages.
U.S. Pat. No. 8,274,238; Part 5 of 6; 400 pages.
U.S. Pat. No. 8,274,238; Part 6 of 6; 52 pages.
Japanese Notice of Reasons for Rejection (English Translation); dated Aug. 1, 2013; for Japanese Pat. App. No. 2010-234111; 2 pages.
Taiwan Allowance Decision of Examination; dated Aug. 30, 2013; for Taiwanese Pat. App. No. 097144152; 2 pages.
Email from Taiwan International Patent & Law Office; dated Sep. 5, 2013; for Taiwanese Pat. App. No. 097144152; 2 pages.
PCT International Preliminary Report on Patentability and Written Opinion of the ISA dated Jan. 16, 2014; for PCT Pat. App. No. PCT/US2012/043275; 6 pages.
PCT International Preliminary Report on Patentability and Written Opinion dated Jan. 16, 2014; for PCT Pat. App. No. PCT/US2012/044149; 7 pages.
U.S. Appl. No. 14/147,167, filed Jan. 7, 2014, Szczeszynski et al.
Office Action dated Jun. 20, 2014 for U.S. Appl. No. 13/177,070, filed Jul. 6, 2011 25 pages.
Restriction Requirement dated Jun. 20, 2014 for U.S. Appl. No. 13/177,075, filed Jul. 6, 2011 7 pages.
Letter from Yuasa and Hara dated Jul. 22, 2014; for Japanese Pat. App. No. 2013-105879; 2 pages.

(56) References Cited

OTHER PUBLICATIONS

Japanese Office Action dated Jun. 4, 2014; for Japanese Pat. App. No. 2013-105879; 2 pages.
Japanese Office Action (English Translation) dated Jun. 4, 2014; for Japanese Pat. App. No. 2013-105879; 2 pages.
Response to Restriction Requirement filed Aug. 15, 2014; to Restriction Requirement dated Jun. 20, 2014; for U.S. Appl. No. 13/177,075; 2 pages.
Second Preliminary Amendment filed Aug. 15, 2014; for U.S. Appl. No. 13/177,075; 10 pages.
Response filed Oct. 27, 2014; to Office Action dated Jun. 20, 2014; for U.S. Appl. No. 13/177,070; 23 pages.
Office Action dated Oct. 30, 2014; for U.S. Appl. No. 13/177,075; 24 pages.
Taiwan Office Action and Search Report, with English translation, dated Oct. 2, 2014; for Taiwan Pat. App. No. 101123288; 19 pages.
Office Action dated Aug. 12, 2014 for U.S. Appl. No. 13/752,904.
Office Action dated Sep. 15, 2014 for U.S. Appl. No. 13/591,564.
Notice of Allowance dated Dec. 5, 2014; for U.S. Appl. No. 14/149,167; 27 pages.
Letter to Yuasa and Hara (including suggested claims) dated Sep. 23, 2014; for Japanese Pat. App. No. 2013-105879; 6 pages.
Japanese Claims as filed on Oct. 3, 2014; for Japanese Pat. App. No. 2013-105879; 4 pages.

\* cited by examiner

DC-DC CONVERTER USING HYSTERETIC
CONTROL AND ASSOCIATED METHODS

FIELD

Subject matter disclosed herein relates generally to electronic circuits and, more particularly, to control techniques for use with DC-DC converters.

BACKGROUND

Light emitting diode (LED) driver circuits are often called upon to drive a number of series connected strings of diodes simultaneously. The strings of diodes (or "LED channels") may be operated in parallel, with a common voltage node supplying all of the strings. A DC-DC converter (e.g., a boost converter, a buck converter, etc.) may be employed by the LED driver circuit to maintain a regulated voltage level on the various LED channels during operation so that all LED channels have adequate operational power. Feedback from the LED channels may be used to control the DC-DC converter. To reduce unnecessary power consumption, it may be desirable to keep the regulated voltage level on the voltage node to a minimum or near minimum, while still providing adequate power to all channels.

Some LED driver circuits are only capable of driving LED channels that are relatively uniform. That is, the driver circuits are only capable of driving channels having the same number of LEDs and the same current levels. In addition, some driver circuits illuminate all driven LEDs at the same time using the same dimming duty cycle. These operational constraints simplify the design of the DC-DC converter associated with the LED driver circuit. Newer LED driver circuits are being proposed that will allow more complex illumination functionality. For example, some proposed designs may allow different numbers of diodes to be used within different LED channels. Some designs may also allow different dimming duty cycles to be specified for different LED channels. In addition, some proposed designs may allow different illumination phasing in different channels (i.e., the LEDs within different channels may be permitted to turn on at different times).

As will be appreciated, any increase in the functional complexity of LED driver circuits, and/or the circuitry they drive, can complicate the design of DC-DC converters and/or converter control circuitry for the drivers. Techniques and circuits are needed that are capable of providing DC-DC voltage conversion within LED driver circuits, and/or other similar circuits, that can support this increased complexity.

SUMMARY

In accordance with one aspect of the concepts, systems, circuits, and techniques described herein, a control circuit for controlling a DC-DC converter comprises: a duty cycle control unit to control a duty cycle of the DC-DC converter, the duty cycle control unit being responsive to a duty cycle control signal at a control input thereof and an enable signal at an enable input thereof, the duty cycle control signal being indicative of a duty cycle to be used in the DC-DC converter, and a control unit coupled to the enable input of the duty cycle control unit to maintain an output voltage of the DC-DC converter within a narrow range during certain time periods by alternately enabling and disabling the duty cycle control unit based, at least in part, on feedback from the DC-DC converter output.

In accordance with another aspect of the concepts, systems, circuits, and techniques described herein, an electronic circuit for use in driving a plurality of light emitting diode (LED) channels coupled to a common voltage node comprises: control circuitry for controlling a DC-DC converter to generate a regulated voltage on the common voltage node, the control circuitry comprising: a duty cycle control unit to control a duty cycle of the DC-DC converter, the duty cycle control unit being responsive to a duty cycle control signal at a control input thereof and an enable signal at an enable input thereof wherein the duty cycle control signal is indicative of a duty cycle to be used by the duty cycle control unit; and a control unit coupled to the enable input of the duty cycle control unit to maintain an output voltage of the DC-DC converter within a narrow range during an "off" period of a dimming duty cycle of a dominant LED channel of the plurality of LED channels by alternately enabling and disabling the duty cycle control unit based, at least in part, on feedback from the DC-DC converter output, wherein the dominant LED channel of the plurality of LED channels is a channel that requires a highest voltage on the common voltage node.

In accordance with a further aspect of the concepts, systems, circuits, and techniques described herein, a method for use in driving a plurality of LED channels coupled to a common voltage node comprises: generating a duty cycle control signal to set a duty cycle of a DC-DC converter coupled to the common voltage node based on voltage needs of a dominant LED channel in the plurality of LED channels, the duty cycle control signal being applied to an input of a duty cycle control unit; and maintaining an output voltage of the DC-DC converter within a narrow range during an "off" portion of a dimming duty cycle of the dominant LED channel by alternately enabling and disabling the duty cycle control unit based, at least in part, on feedback from the DC-DC converter output.

BRIEF DESCRIPTION OF THE DRAWINGS

The foregoing features may be more fully understood from the following description of the drawings in which.

DETAILED DESCRIPTION

Figure 1:
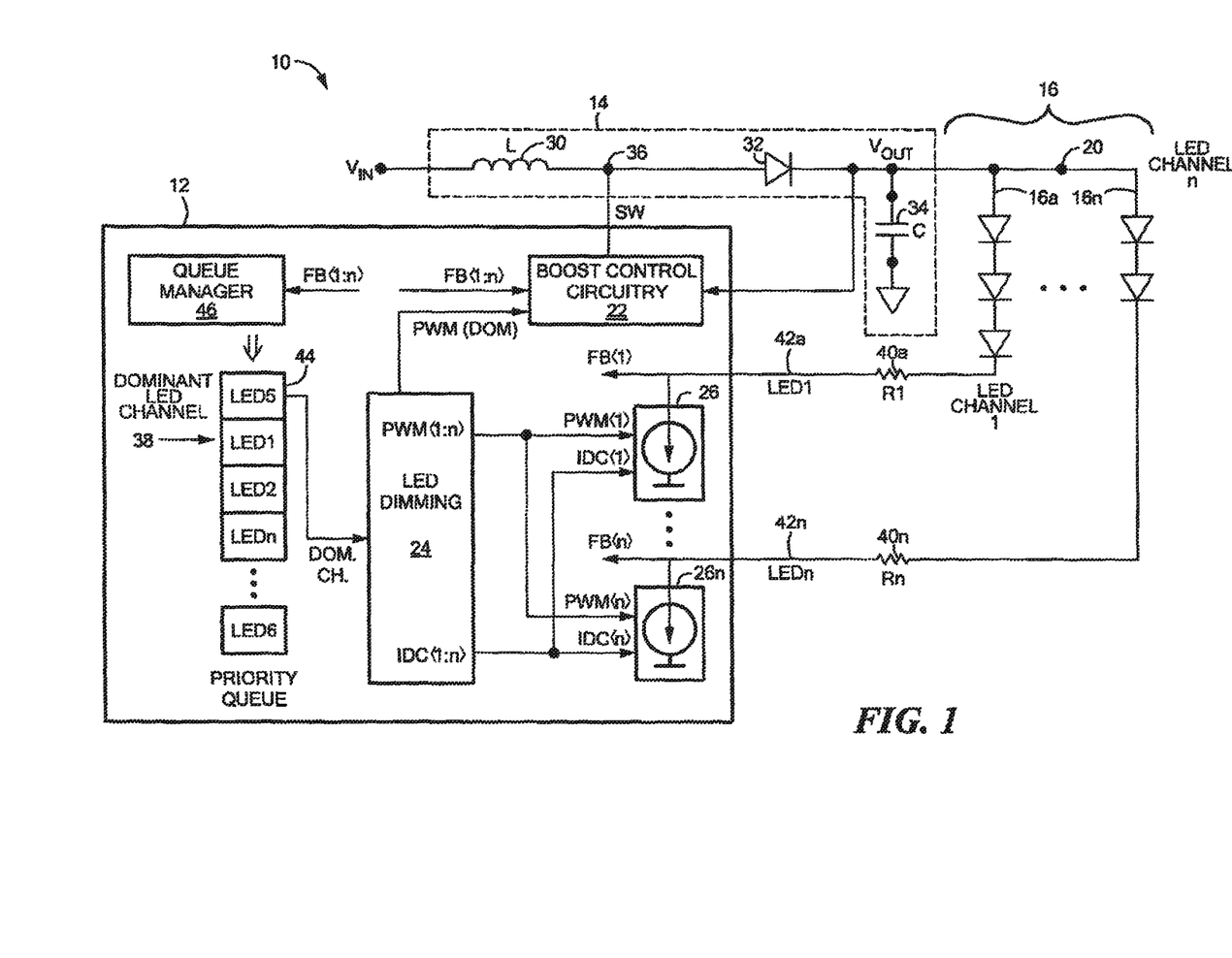
FIG. 1 is a schematic diagram illustrating an exemplary system for use in driving light emitting diodes (LEDs), or other similar load devices, in accordance with an embodiment.

FIG. 1 is a schematic diagram illustrating an exemplary system 10 for use in driving light emitting diodes (LEDs), or other similar load devices, in accordance with an embodiment. As shown, system 10 may include LED driver circuitry 12 and a boost converter 14. The system 10 may drive a plurality of LEDs 16. As shown, the plurality of LEDs 16 may be arranged in individual, series-connected strings 16a, ..., 16n that are each coupled to a common voltage node 20. These series-connected strings will be referred to herein as LED channels 16a, ..., 16n. Any number of LED channels 16a, ..., 16n may be driven by system 10. In addition, in some implementations, each LED channel 16a, ..., 16n may be allowed to have a different number of LEDs. The LEDs 16 may be intended to provide any of a number of different illumination functions (e.g., backlighting for a liquid crystal display, LED panel lighting, LED display lighting, and/or others).

In some embodiments, LED driver circuitry 12 may be implemented as an integrated circuit (IC) and boost converter 14 may be connected externally to the IC. In other embodiments, an IC may be provided that includes both LED driver circuitry 12 and boost converter 14. In still other embodiments, system 10 may be realized using discrete circuitry. As will be appreciated, any combination of integrated circuitry and discrete circuitry may be used for system 10 in various implementations. In the discussion that follows, it will be assumed that LED driver circuitry 12 is implemented as an IC.

Boost converter 14 is a DC-DC voltage converter that is used to convert a direct current (DC) input voltage $V_{IN}$ to a regulated output voltage on output voltage node 20 for use in driving LEDs 16. As is well known, a boost converter is a form of switching regulator that utilizes switching techniques and energy storage elements to generate a desired output voltage. Control circuitry for boost converter 14 may be provided within LED driver circuitry 12. Although illustrated as a boost converter in FIG. 1, it should be appreciated that other types of DC-DC converters may be used in other embodiments (e.g., buck converters, boost-buck converters, etc.).

As illustrated in FIG. 1, LED driver circuitry 12 may include boost control circuitry 22 for use in controlling the operation of boost converter 14. LED driver circuitry 12 may also include LED dimming logic 24 and a number of current sinks 26a, ..., 26n. The current sinks 26a, ..., 26n are current regulators that may be used to draw a regulated amount of current through the LED channels 16a, ..., 16n during LED drive operations. In at least one embodiment, one current sink 26a, ..., 26n may be provided for each LED channel 16a, ..., 16n. LED dimming logic 24 is operative for controlling the brightness of the LEDs in the various channels 16a, ..., 16n. LED dimming logic 24 may control the brightness of an LED channel by, for example, changing the current and/or the pulse width modulation (PWM) duty cycle (or "dimming" duty cycle) of the channel. In some embodiments, LED dimming logic 24 may be capable of independently controlling both the current level and the dimming duty cycle of each of the LED channels 16a, ..., 16n by providing appropriate control signals to corresponding current sinks 26a, ..., 26n. In some embodiments, LED dimming logic 24 may also be capable of independently adjusting the illumination "on" time or phase of the LED channels 16a, ..., 16n (i.e., the time when a channel first lights up during a cycle).

In at least one embodiment, LED driver circuitry 12 may be user programmable. That is, LED driver circuitry 12 may allow a user to set various operational characteristics of system 10. One or more data storage locations may be provided within LED driver circuitry 12 to store user-provided configuration information to set operational parameters such as, for example, dimming duty cycle of different LED channels, current levels of different LED channels, illumination "on" times of different LED channels, and/or other parameters. In some implementations, a user may also be able to specify which LED channels are active and which LED channels are inactive (i.e., disabled). Default values may be used for the different parameters in the absence of user provided values.

As described above, boost converter 14 is operative for converting a DC input voltage $V_{IN}$ into a DC output voltage $V_{OUT}$ that is adequate to supply LED channels 16a, ..., 16n. In the illustrated embodiment, boost converter 14 includes an inductor 30, a diode 32, and a capacitor 34. Other boost converter architectures may alternatively be used. The operating principles of boost converters are well known in the art. To operate properly, a switching signal having appropriate characteristics must be provided to boost converter 14. Boost control circuitry 22 of LED driver circuitry 12 is operative for providing this switching signal. As will be described in greater detail, boost control circuitry 22 may draw current from switching node 36 of boost converter 14 at a controlled duty cycle to regulate the output voltage $V_{out}$ in a desired manner.

The goal of boost converter 14 and boost control circuitry 22 is to provide an adequate voltage level on voltage node 20 to support operation of all active LED channels 16a, ..., 16n. To conserve energy, however, it may be desired that the voltage level on voltage node 20 be no higher (or only slightly higher) than a minimum level required to support operation. To achieve this, boost control circuitry 22 may rely, at least in part, on feedback from LED channels 16a, ..., 16n. Typically, the voltage level required for a particular LED channel will be dictated by the needs of the current sink 26a, ..., 26n associated with the channel. That is, each current sink 26a, ..., 26n may require a minimal amount of voltage (e.g., an LEDx regulation voltage) to support operation for the corresponding LED channel.

In general, the voltage level on each current sink 26a, ..., 26n will be equal to the difference between the voltage on voltage node 20 and the voltage drop across the LEDs in the corresponding LED channel 16a, ..., 16n. Because each LED channel 16a, ..., 16n may have a different number of LEDs and a different DC current, different LED channels may require different minimum voltage levels for proper operation. The LED channel that requires the highest voltage level on node 20 for proper operation will be referred to herein as the "dominant" LED channel. As will be appreciated, in some implementations, the dominant LED channel may change with time.

As shown in FIG. 1, in some implementations, optional ballast resistors 40a, ..., 40n may be used in one or more of the LED channels 16a, ..., 16n to provide balance between the voltage levels on the various current sinks 26a, ..., 26n. As described above, when no ballast resistor is present, the voltage across a current sink will typically be equal to the difference between the boost output voltage on node 20 and the voltage drop across the LEDs in the corresponding channel. Ballast resistors 40a, ..., 40n may be provided, for example, to generate an additional voltage drop in some channels to achieve similar voltages on the various current sinks 26a, ..., 26n. In this manner, some of the power dissipation that might have occurred on chip within LED driver circuitry 12 can be moved off chip to the ballast resistors 40a, ..., 40n.

Figure 2:
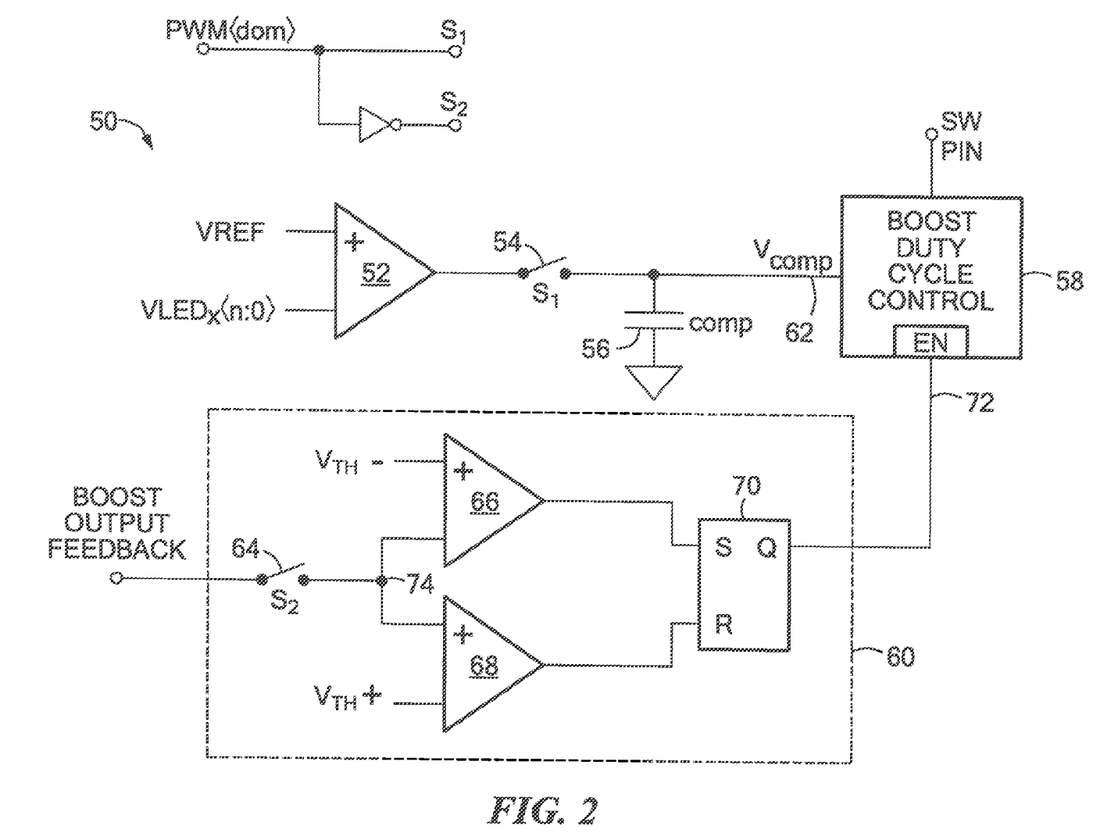
FIG. 2 is a schematic diagram illustrating exemplary boost control circuitry in accordance with an embodiment.

FIG. 2 is a schematic diagram illustrating exemplary boost control circuitry 50 in accordance with an embodiment. The boost control circuitry 50 may be used within the system 10 of FIG. 1 (i.e., as control circuitry 22) and/or in other systems. In the discussion that follows, boost control circuitry 50 will be described in the context of system 10 of FIG. 1. As shown in FIG. 2, boost control circuitry 50 may include: an error amplifier 52, a switch 54, a COMP capacitor 56, a boost duty cycle control unit 58, and a hysteretic controller 60. As will be described in greater detail, boost control circuitry 50 may set a duty cycle for boost converter 14 of FIG. 1 based on the needs of the current dominant LED channel. In addition, during the "off" portion of the dimming duty cycle of the dominant LED channel, boost control circuitry 50 may use hysteretic controller 60 (also referred to herein as control unit 60) to maintain the boost output voltage of boost converter 14 within a desirable range.

As described above, in some embodiments, LED driver circuitry 12 may be partially or fully implemented as an IC. In such embodiments, boost control circuitry 50 of FIG. 2 may be fully implemented on-chip or one or more elements thereof (e.g., COMP capacitor 56) may be implemented off-chip. In addition, it should be understood that the elements of boost control circuitry 50 shown in FIG. 2 will not necessarily be located in close proximity to one another within a realized circuit. That is, in some implementations, the elements may be spread out within a larger system and coupled together using appropriate interconnect structures.

With reference to FIG. 2, boost duty cycle control unit 58 may be coupled to a switching node within a corresponding boost converter (e.g., SW node 36 in boost converter 14 of FIG. 1). During operation, boost duty cycle control unit 58 may draw current from the switching node at a controlled duty cycle in a manner that results in a desired DC voltage level at the boost output (i.e., on voltage node 20 in FIG. 1). Boost duty cycle control unit 58 may include an input 62 to receive a duty cycle control signal to set the duty cycle of the boost converter. In the illustrated embodiment, the voltage across a capacitor 56 coupled to input 62 of boost duty cycle control unit 58 serves as the duty cycle control signal.

Switch 54 is operative for controllably coupling an error signal output by error amplifier 52 to capacitor 56 to charge the capacitor to an appropriate level for use as the duty cycle control signal. As described previously, in some implementations, the duty cycle of boost converter 14 may be set based upon the needs of the dominant LED channel (i.e., the channel that requires the highest voltage). In one embodiment, switch 54 may be controlled based on the dimming duty cycle of the dominant LED channel. For example, switch 54 may be closed during the "on" portion of the dimming duty cycle of the dominant LED channel and open during the "off" portion. The resulting voltage on capacitor 56 will generate a duty cycle that produces a voltage at the output of boost converter 14 that is adequate to drive the dominant LED channel. After switch 54 is opened, the voltage on capacitor 56 will remain relatively constant until the switch 54 is again closed in a subsequent cycle.

The error signal that is used to charge capacitor 56 may be generated based on feedback from LED channels 16a, ..., 16n of FIG. 1. Referring back to FIG. 1, the feedback may include, for example, the voltages across current sinks 26a, ..., 26n (i.e., the voltages on LED pins 42a, ..., 42n of the IC). Feedback from other portions of the LED channels may be used in other implementations.

With reference to FIG. 2, in at least one implementation, error amplifier 52 may include a trans-conductance amplifier that generates an error current at an output thereof. The error current may be coupled to capacitor 56 by switch 54 to charge the capacitor. The trans-conductance amplifier may, for example, amplify a difference between the LED feedback and a reference voltage $V_{REF}$ to generate the error current. The reference voltage may represent, for example, the LED pin regulation voltage (e.g., 0.5 volts in one embodiment).

In at least one embodiment, a mean or average voltage level across the active current sinks of the LED driver circuitry may be determined within the trans-conductance amplifier using the LED feedback. The difference between this mean or average voltage level and $V_{REF}$ may then be used to generate the error signal. As will be appreciated, other techniques for generating the error signal may be used in other implementations. For example, in one approach, an error signal may be generated by amplifying a difference between a feedback signal associated with only one of the LED channels (e.g., the dominant channel, the channel having the most LEDs, etc.) and a reference voltage. Other techniques may also be used. In at least one embodiment, an error amplifier may be used that generates a voltage error signal instead of a current error signal.

As described above, in some embodiments, the duty cycle of boost converter 14 of FIG. 1 may be set based upon the needs of the dominant LED channel. The output voltage of boost converter 14 may then be maintained at the level required by the dominant LED channel (or near that voltage) even when the dominant LED channel is no longer conducting. Thus, the highest voltage associated with the dominant LED channel may be used for each of the other LED channels being driven, regardless of the dimming duty cycle, DC current level, or illumination start time of the other channels. The voltage value on capacitor 56 may remain relatively constant when the dominant LED channel is not conducting because switch 54 will be open. However, other effects in system 10 (load from other channels) may cause the voltage value at the boost output to vary during this time. As described above, hysteretic controller 60 may be used to maintain the voltage at the output of the boost converter within a specific range during this period. Hysteretic controller 60 may accomplish this by alternately enabling and disabling boost duty cycle control unit 58 based on feedback from boost converter 14.

As illustrated in FIG. 2, hysteretic controller 60 may include: an input switch 64; first and second hysteretic comparators 66, 68; and a latch 70. An output terminal of latch 70 may be coupled to enable input 72 of boost duty cycle control unit 58. In some embodiments, hysteretic controller 60 may be enabled during the "off" portion of the dimming duty cycle of the dominant LED channel. Thus, switch 64 may operate in anti-phase with switch 54 described previously. When enabled, a boost output feedback signal may be applied to an input node 74 of hysteretic controller 60. The boost output feedback signal may represent, in at least one embodiment, a difference between a current boost output voltage and the voltage drop across the LEDs of the dominant channel when the dominant channel was conducting.

The hysteretic comparators 66, 68 each compare the boost output feedback signal on node 74 to a corresponding threshold value. That is, first comparator 66 will compare the signal to an lower threshold value ($V_{TH-}$) and second comparator 68 will compare the signal to a higher threshold value ($V_{TH+}$). If the boost output feedback signal transitions lower than $V_{TH-}$ first comparator 66 will output a logic high value. If the boost output feedback signal transitions higher $V_{TH+}$, second comparator 68 will output a logic high value. In at least one embodiment, upper threshold value ($V_{TH+}$) may be equal to the allowable ripple in the boost output signal and lower threshold value ($V_{TH-}$) may be equal to the LED regulation voltage. The output of first comparator 66 may be coupled to a "set" input of latch 70 and the output of second comparator 68 may be coupled to a "reset" input of latch 70. As is well known, a logic high value at the set input of a latch will transfer to the output Q of the latch. Conversely, a logic high value at the reset input of a latch will cause the latch output to reset to logic low.

In the embodiment illustrated in FIG. 2, a logic high on enable input 72 of boost duty cycle control unit 58 will enable the unit and a logic low on enable input 72 will disable the unit. When the boost duty cycle control unit 58 is enabled, it will operate in a normal fashion to control boost converter 14 at the duty cycle set by the duty cycle control signal on input 62. When disabled, boost duty cycle control unit 58 will cease to control boost converter 14, and the boost output voltage on node 20 (at least initially) will be the voltage currently stored across capacitor 34. This voltage will begin to decrease as charge begins to flow out of capacitor 34 through one or more active LED channels. To control the voltage at the boost output, hysteretic controller 60 may disable boost duty cycle control unit 58 when the boost output voltage transitions above $V_{TH+}$ and enable boost duty cycle control unit 58 when the boost output voltage falls below $V_{TH-}$. In this manner, the boost output voltage may be maintained within a relatively narrow range defined by the two threshold voltages. This boost output voltage is available to power any LED channels that are conducting during the "off" period of the dominant LED channel. Because the duty cycle control signal on input 62 of boost duty cycle control unit 58 remains relatively constant, each time boost duty cycle control unit 58 is enabled during a hysteretic control period, it can immediately start controlling boost converter 14 based on the duty cycle of the dominant LED channel.

Figure 3:
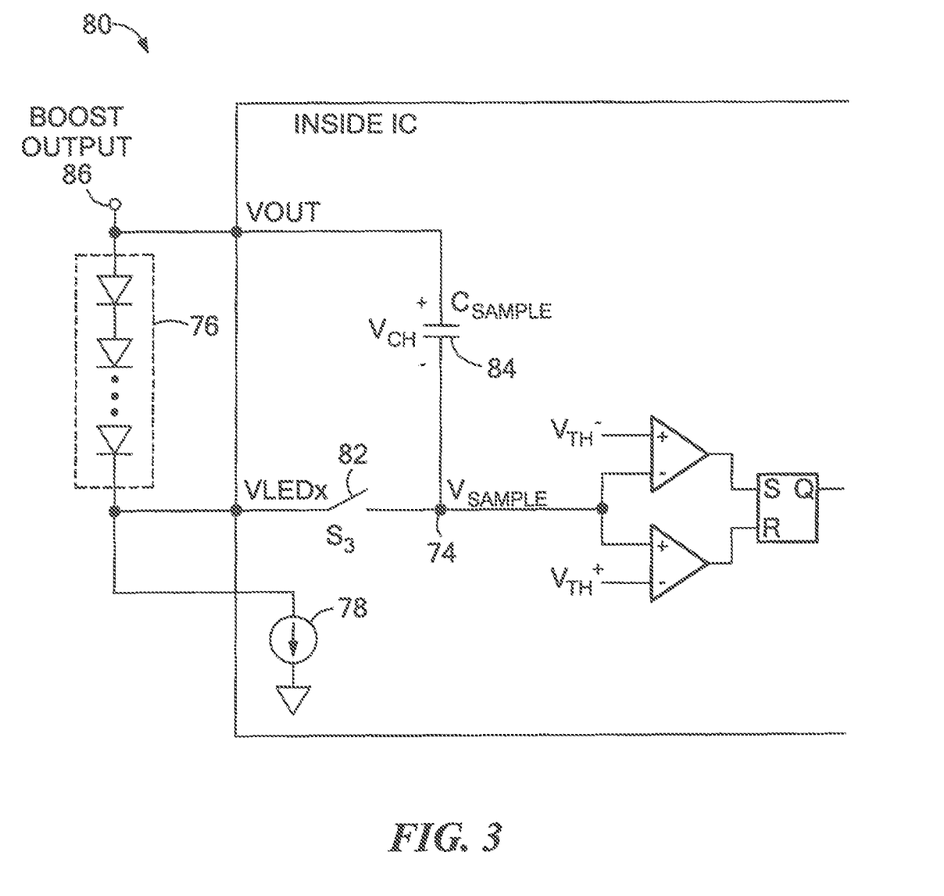
FIG. 3 is a schematic diagram illustrating exemplary circuitry for generating boost output feedback for use by a hysteretic controller in accordance with an embodiment.

FIG. 3 is a schematic diagram illustrating feedback circuitry 80 that may be used to generate the boost output feedback signal on node 74 of hysteretic controller 60 of FIG. 2 in accordance with an embodiment. As described above, in at least one embodiment, the boost output feedback signal may be equal to a difference between a current boost output voltage and a voltage drop across the LEDs of the dominant channel when the dominant channel was conducting. Circuitry 80 of FIG. 3 is capable of generating such a feedback signal. As shown, circuitry 80 may include: the dominant LED channel 76, the current sink 78 associated with the dominant LED channel, a switch 82, and a sample capacitor 84. The switch 82 may be closed during the "on" portion of the dimming duty cycle of dominant LED channel 76 and open otherwise. Therefore, during the "on" portion of the dimming duty cycle of dominant LED channel 76, capacitor 84 will charge to the voltage across the LEDs of dominant channel 76. When switch 82 subsequently opens, the voltage on node 74 will equal the difference between the current boost output voltage on node 86 and the voltage across sample capacitor 84 (i.e., the voltage drop that was previously across the LEDs of dominant channel 76). This is the voltage that will then be compared to the upper and lower thresholds in hysteretic controller 60. It should be appreciated that other techniques for developing a boost output feedback signal for use by hysteretic controller 60 may alternatively be used.

Figure 4:
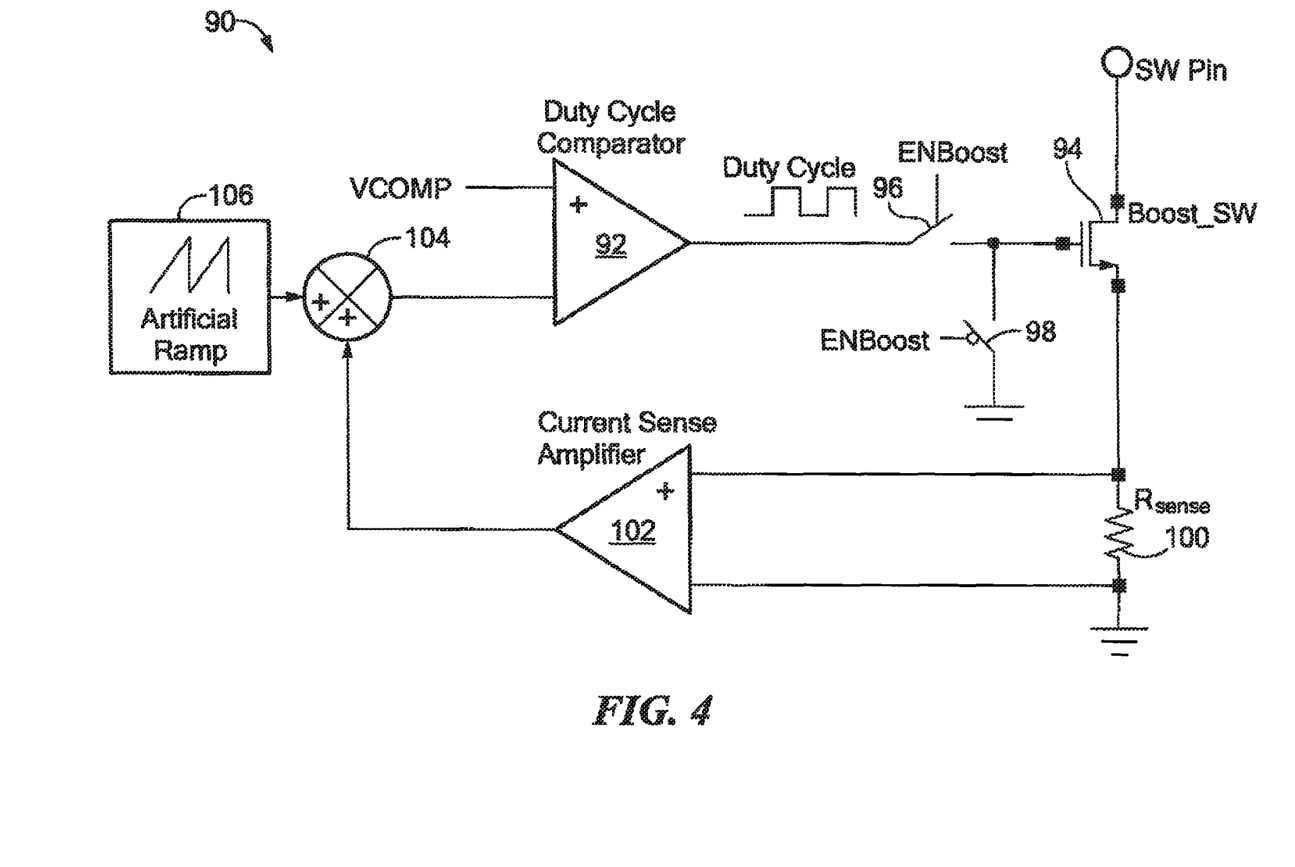
FIG. 4 is a schematic diagram illustrating exemplary circuitry within a boost duty cycle control unit in accordance with an embodiment.

FIG. 4 is a schematic diagram illustrating exemplary circuitry within a boost duty cycle control unit 90 in accordance with an embodiment. Boost duty cycle control unit 90 may be used in boost control circuitry 50 of FIG. 2 (i.e., as boost duty cycle control unit 58) or in other voltage converter systems. As illustrated, boost duty cycle control unit 90 may include: a duty cycle comparator 92; a boost switch 94; first and second enable switches 96, 98; a current sense resistor 100; a current sense amplifier 102; a summer 104; and a ramp generator 106. Boost switch 94 is the switch that performs the switching for, for example, boost converter 14 in FIG. 1. As illustrated, a drain terminal of boost switch 94 may be coupled to a switching node (SW) of the boost converter (e.g., node 36 in FIG. 1).

Duty cycle comparator 92 is operative for generating the input signal of boost switch 94 having the desired duty cycle. To generate the input signal, duty cycle comparator 92 may compare a duty cycle control signal (e.g., $V_{COMP}$ in FIG. 2) to a ramp signal. Ramp generator 106 is operative for generating the ramp signal. In some embodiments, current sense resistor 100, current sense amplifier 102, and summer 104 may be used to modify the ramp signal to compensate for a current level being drawn through boost switch 94.

First and second enable switches 96, 98 are operative for allowing boost duty cycle control unit 90 to be controllably enabled and disabled. In the illustrated embodiment, the first and second enable switches 96, 98 may be controlled in a complementary fashion. Thus, to enable boost duty cycle control unit 90, switch 96 may be closed and switch 98 may be opened. To disable boost duty cycle control unit 90, switch 96 may be opened and switch 98 may be closed. It should be appreciated that boost duty cycle control unit 90 of FIG. 4 represents one possible architecture that may be used in an embodiment. Other control architectures may alternatively be used. Also, first and second enable switches 96, 98 represent one example technique that may be used to enable and disable a duty cycle control unit in accordance with an embodiment.

Figure 5:
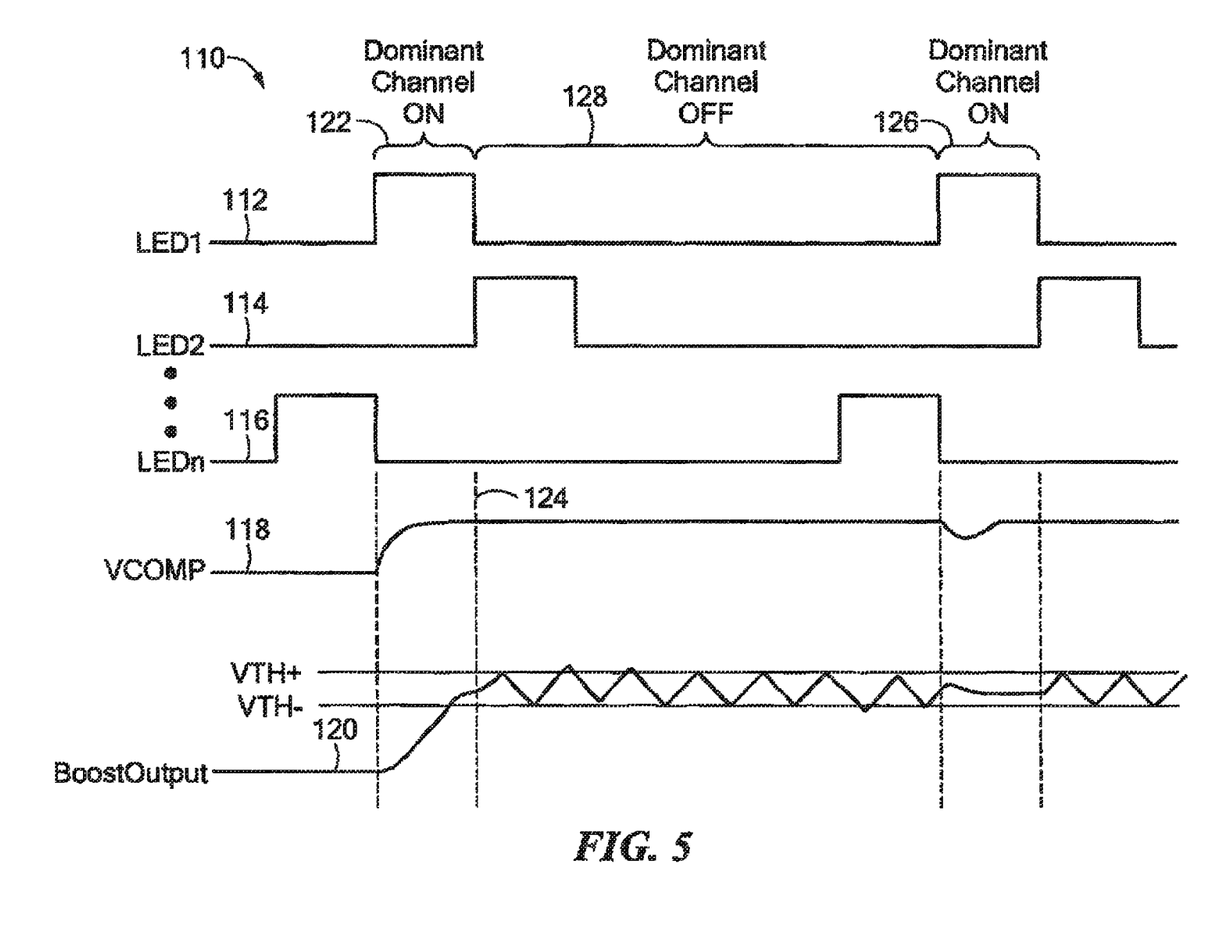
FIG. 5 is a timing diagram illustrating exemplary waveforms that may be generated within LED driver circuitry in accordance with an embodiment.

FIG. 5 is a timing diagram illustrating various waveforms 110 that may be generated within the circuitry of FIGS. 1 and 2 in an example implementation. In the following discussion, reference may be made to FIGS. 1 and 2. Waveforms 112, 114, 116 represent voltage signals that may appear on LED pins 42a, ..., 42n of LED driver circuitry 12 of FIG. 1 during system operation, for different LED channels. The pulses in waveforms 112, 114, 116 represent periods during which the LEDs in the corresponding channels are conducting. For purposes of illustration, it will be assumed that LED channel 1 associated with waveform 112 is the dominant LED channel. Waveform 118 represents a duty cycle control signal ($V_{COMP}$) that may be generated for boost duty cycle control unit 58 of FIG. 2. As shown, during the "on" portion 122 of the dimming duty cycle of the dominant LED channel (i.e., LED channel 1), the voltage of duty cycle control signal 118 increases due to the charging of COMP capacitor 56 of FIG. 2 (when switch 54 is closed). When the "on" portion of the dimming duty cycle ends 124, switch 54 will open and the voltage of duty cycle control signal 118 will remain relatively constant thereafter until the next "on" portion 126.

As shown in FIG. 5, the increasing duty cycle control signal 118 during "on" period 122 will cause a corresponding increase in boost output voltage 120. When the "on" portion of the dimming duty cycle of the dominant LED channel ends 124, hysteretic controller 60 may be enabled. As shown, hysteretic controller 60 may maintain the boost output voltage 120 within a narrow range between $V_{TH-}$ and $V_{TH+}$ during the "off" portion 128 of the dimming duty cycle of the dominant LED channel. During the subsequent "on" portion 126 of the dominant channel, the hysteretic controller 60 will be disabled, and boost duty cycle control unit 58 will operate in a normal fashion. As in apparent in FIG. 5, the action of the hysteretic controller results in some ripple in the boost output signal. However, this ripple is much smaller than it would be if the boost output were readjusted each time LED channel load requirements changed during period 128.

As described above, in some implementations, the dominant LED channel may change with time. For example, in some implementations, a user may be permitted to disable one or more LED channels during system operation. If one of the disabled channels is the dominant channel, a new dominant channel needs to be identified. In some implementations, it may be possible to add one or more LEDs to a channel after system deployment. This can also affect the dominant LED channel. In addition, during system operation, it may be discovered that one or more of non-dominant LED channels is not receiving enough power. In this case, the underpowered channel may be made the dominant channel.

Referring back to FIG. 1, in some implementations, a priority queue 38 may be maintained that tracks the various LED channels in order of priority. A highest priority channel 44 in the queue 38 may represent the dominant LED channel. Digital memory may be provided within LED driver circuitry 12 to store priority queue 38. Priority queue 38 may be continually updated during system operation so that the dominant LED channel is always known. Priority queue 38 may provide the updated dominant LED channel information to LED dimming logic 24 and/or boost control circuitry 22. LED dimming logic 24 may need this information to provide the appropriate dimming duty cycle information to boost control circuitry 22 for use in controlling boost converter 14.

In some implementations, a queue manager 46 may be provided for maintaining and updating priority queue 38. Queue manager 46 may, for example, include a digital or analog controller that is capable of identifying the occurrence of certain events and/or conditions that may require a change in LED channel priority. In some implementations, for example, queue manager 46 may receive feedback from LED channels 16a, . . . , 16n. This feedback may include, for example, voltage levels on the LED pins 42a, . . . , 42n of the LED driver circuitry 12, or some other feedback. If queue manager 46 detects, based on the feedback, that one of the LED channels requires more voltage (e.g., the pin voltage for the channel is below a specified regulation voltage), it may move that channel to the top of priority queue 38. When the LED channel is moved, all of the other channels may be moved down in priority. Queue manager 46 may also have access to information describing which LED channels have been disabled by a user. If the highest priority LED channel in the queue 38 is disabled, queue manager 46 may move that channel to the lowest priority position in queue 38. All other LED channels may then be moved up in priority. In one possible approach, the LED channels may initially be listed in a default order within priority queue 38. The action of queue manager 46 may then rearrange and maintain the order of the channels so that the channel in the highest priority position is the dominant LED channel.

In at least one embodiment, instead of a queue, one or more storage locations may be provided within LED driver circuitry 12 to record and track the identity of the current dominant LED channel. A controller may be provided to continually update the identity of the dominant channel stored in the storage location(s) based on events and conditions.

Figure 6:
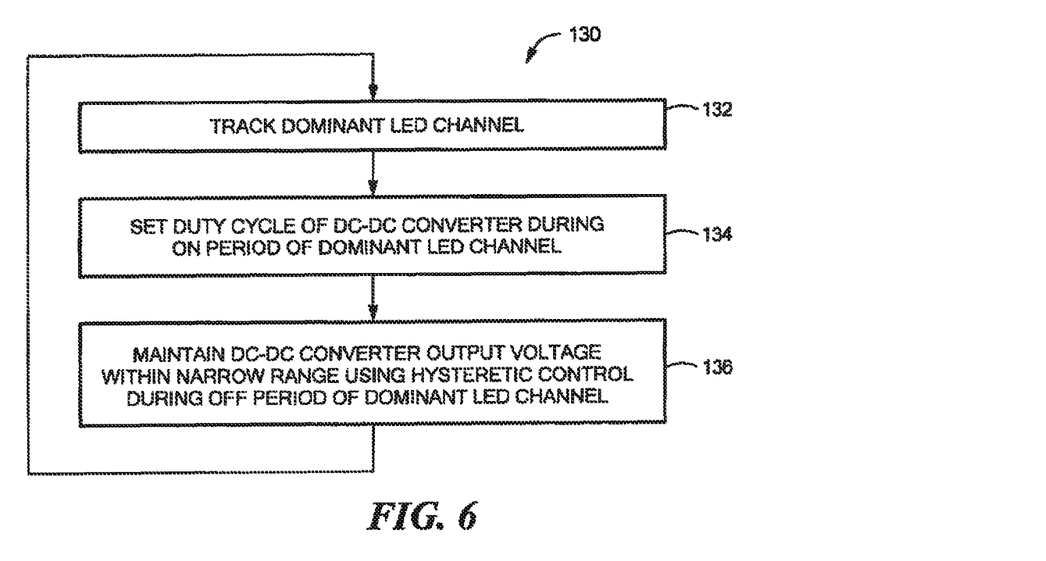
FIG. 6 is a flowchart illustrating an exemplary method of operating LED driver circuitry in accordance with an embodiment.

FIG. 6 is a flowchart illustrating an exemplary method 130 for operating LED driver circuitry for driving a plurality of LED channels in accordance with an embodiment. A dominant LED channel within the plurality of LED channels is tracked (block 132). As described above, the dominant LED channel is the channel requiring the highest voltage at a particular point in time. A priority queue may be used to track the dominant LED channel. A duty cycle of a DC-DC converter generating a drive voltage for the plurality of LED channels may be set during an "on" period of a dimming duty cycle of the current dominant LED channel (block 134). In one approach, the duty cycle may be set by charging a capacitor using an error signal during the "on" period of the dominant LED channel. The error signal may be generated by determining a difference between LED feedback information and a reference signal. Hysteretic control may then be used to maintain the DC-DC converter output voltage within a relatively narrow range during the "off" period of the dominant LED channel (block 136). The above described process may be continually repeated during LED drive activity using the updated dominant LED channel information.

In some embodiments, the hysteretic control of block 136 may involve enabling and disabling a DC-DC converter duty cycle control unit based on feedback from the converter output. In one approach, the feedback from the converter output may be compared with upper and lower threshold values. The DC-DC converter duty cycle control unit may then be disabled if the feedback from the converter output transitions above the upper threshold value. After the duty cycle control unit has been disables, the output voltage of the DC-DC converter may begin to drop. The DC-DC converter duty cycle control unit may be enabled if the feedback from the converter output transitions below the lower threshold value. In one implementation, the feedback from the converter output may include a difference between a current converter output voltage and a voltage drop that existed across the LEDs of the dominant LED channel during the most recent "on" period of the channel. In this implementation, the lower threshold may include, for example, an LED regulation voltage and the upper threshold may represent a maximum desired ripple in the DC-DC output voltage, although other threshold values may be used in other embodiments.

Figure 7:
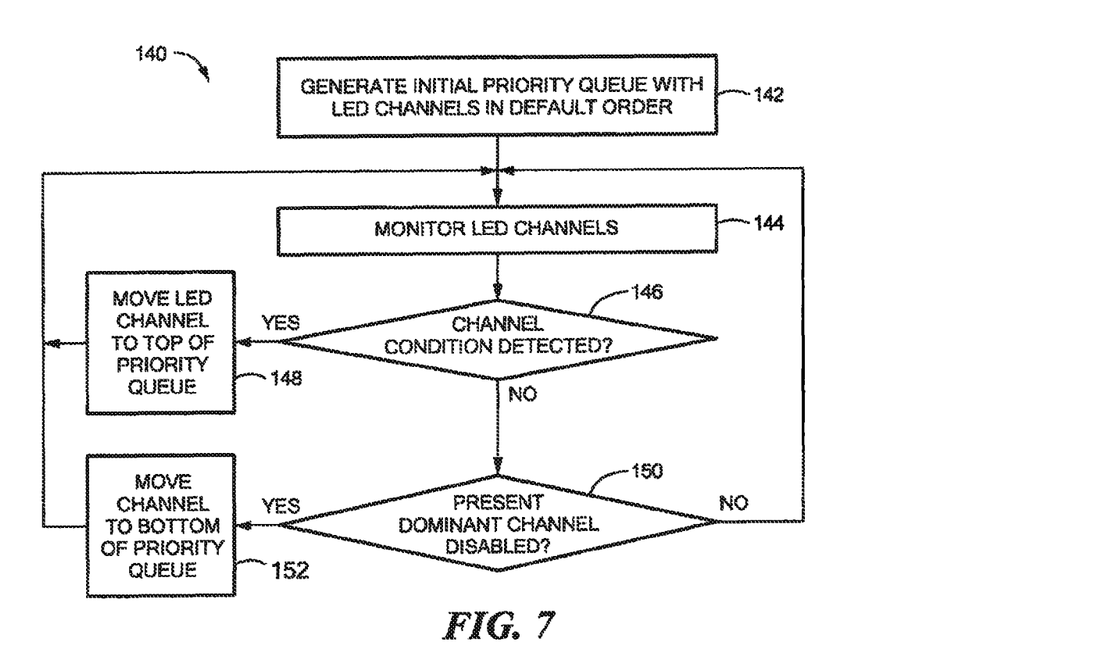
FIG. 7 is a flowchart illustrating an exemplary method for tracking a dominant LED channel in an LED driver using priority queuing in accordance with an embodiment.

FIG. 7 is a flowchart illustrating an exemplary method 140 for tracking a dominant LED channel being driven by an LED driver using priority queuing in accordance with an embodiment. The method 140 may be implemented, for example, within LED driver circuits that are capable of driving multiple LED channels having different numbers of LEDs per channel. An initial priority queue may first be generated that lists the LED channels in a default priority order (block 142). The default priority order may be an order based on the physical location of the channels (e.g., listing the LED channels by LED channel number). Other techniques for defining the default priority order may alternatively used. For example, in one approach, the initial priority order may list the LED channels based, at least in part, on a number of LEDs per channel or some other criterion. The LED channel having the highest priority in the priority queue is considered the dominant LED channel.

After the initial priority queue has been established, the LED channels may be monitored to identify the occurrence of events or conditions that require an update in the priority queue (block 144). Some channel conditions may require that a new dominant LED channel be selected. For example, if it is determined that the voltage on a current sink associated with a particular LED channel is below a specified regulation voltage during the "on" portion of the dimming duty cycle of the channel, then that LED channel may be made the new dominant LED channel. If there are more than one LED strings below the regulation voltage during the "on" portion of the dimming duty cycle then the latest LED string may be considered the dominant LED channel. If such a channel condition is detected for a particular LED channel (block 146-Y), the corresponding channel may be moved to the top of the priority queue (block 148). If it is determined during monitoring that the present dominant channel has become disabled (block 150-Y), then that channel may be moved to the bottom of the priority queue (block 152). This process may be repeated in a continual fashion during driver operation to keep an updated indication of LED channel priorities and an updated indication of the dominant LED channel. As described previously, the updated dominant channel information may be used by other circuitry within the LED driver (e.g., by DC-DC converter control circuitry, etc.).

In the description above, techniques and circuits for providing control for a DC-DC converter have been discussed in the context of LED driver circuitry. It should be appreciated, however, that these techniques and circuits may also be used in other applications. For example, in some implementations, the described techniques and circuits may be used in driver circuits that drive load devices other than LEDs. The described techniques and circuits may also have application in other types of systems, components, and devices that require the generation of a regulated voltage level.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A control circuit for controlling a DC-DC converter, the control circuit comprising:
   a duty cycle control unit to control a duty cycle of the DC-DC converter, the duty cycle control unit being responsive to a duty cycle control signal at a control input thereof and an enable signal at an enable input thereof, the duty cycle control signal being indicative of a duty cycle to be used in the DC-DC converter; and
   a control unit coupled to the enable input of the duty cycle control unit to maintain an output voltage of the DC-DC converter within a narrow range during certain time periods by alternately enabling and disabling the duty cycle control unit based, at least in part, on feedback from the DC-DC converter output;
   wherein the duty cycle control unit comprises:
      a comparator to compare the duty cycle control signal to a periodic ramp signal to generate a duty cycle output signal;
      a current switch to draw current from the DC-DC converter in response to the duty cycle output signal; and
      at least one enable switch to de-couple the current switch from the duty cycle output signal in response to the enable signal on the enable input of the duty cycle control unit.

2. The control circuit of claim 1, wherein:
   the duty cycle control unit is configured so that the duty cycle control signal at the control input of the duty cycle control unit remains substantially constant while the control unit alternately enables and disables the duty cycle control unit.

3. The control circuit of claim 1, wherein:
   the control unit is configured to disable the duty cycle control unit if the feedback from the DC-DC converter output transitions above an upper threshold voltage and to enable the duty cycle control unit if the feedback from the DC-DC converter output transitions below a lower threshold voltage.

4. The control circuit of claim 3, wherein:
   the control unit includes a first comparator to compare the feedback from the DC-DC converter output to the upper threshold voltage and a second comparator to compare the feedback from the DC-DC converter output to the lower threshold voltage.

5. The control circuit of claim 4, wherein:
   the control unit further includes a latch having a set input, a reset input, and an output, the set input being coupled to receive an output of one of the first and second comparators, the reset input being coupled to receive an output of the other of the first and second comparators, and the latch output being coupled to the enable input of the duty cycle control unit.

6. The control circuit of claim 1, wherein:
   the control circuit is part of light emitting diode (LED) driver circuitry to drive a plurality of LED channels coupled to a common voltage node, each LED channel in the plurality of LED channels including of a series-connected string of LEDs, the plurality of LED channels having a dominant LED channel that requires a highest voltage on the common voltage node, the dominant LED channel having a corresponding dimming duty cycle, wherein the certain time periods during which the control unit is operative for maintaining the output voltage of the DC-DC converter within the narrow range comprise the "off" periods of the dimming duty cycle of the dominant LED channel.

7. An electronic circuit for use in driving a plurality of light emitting diode (LED) channels coupled to a common voltage node, each LED channel in the plurality of LED channels including of a series-connected string of LEDs, the electronic circuit comprising:
   control circuitry for controlling a DC-DC converter to generate a regulated voltage on the common voltage node, the control circuitry comprising:
      a duty cycle control unit to control a duty cycle of the DC-DC converter, the duty cycle control unit being responsive to a duty cycle control signal at a control input thereof and an enable signal at an enable input thereof, wherein the duty cycle control signal is indicative of a duty cycle to be used by the duty cycle control unit; and
      a control unit coupled to the enable input of the duty cycle control unit to maintain an output voltage of the DC-DC converter within a narrow range during an "off" period of a dimming duty cycle of a dominant LED channel of the plurality of LED channels by alternately enabling and disabling the duty cycle control unit based, at least in part, on feedback from the DC-DC converter output, wherein the dominant LED channel of the plurality of LED channels is a channel that requires a highest voltage on the common voltage node.

8. The electronic circuit of claim 7, wherein:
   the duty cycle control signal is configured so that the duty cycle control signal at the control input of the duty cycle control unit remains substantially constant while the control unit alternately enables and disables the duty cycle control unit.

9. The electronic circuit of claim 7, wherein:
   the control unit is configured to disable the duty cycle control unit if the feedback from the DC-DC converter output transitions above an upper threshold voltage and to enable the duty cycle control unit if the feedback from the DC-DC converter output transitions below a lower threshold voltage.

10. The electronic circuit of claim 9, wherein:
    the control unit includes a first comparator to compare the feedback from the DC-DC converter output to the upper threshold voltage and a second comparator to compare the feedback from the DC-DC converter output to the lower threshold voltage.

11. The electronic circuit of claim 10, wherein:
    the control unit further includes a latch having a set input, a reset input, and an output, the set input being coupled to receive an output of one of the first and second comparators, the reset input being coupled to receive an output of the other of the first and second comparators, and the latch output being coupled to the enable input of the duty cycle control unit.

12. The electronic circuit of claim 7, wherein:
the duty cycle control signal at a control input of the duty cycle control unit is generated based on the voltage needs of the dominant LED channel.

13. The electronic circuit of claim 7, wherein:
the control circuitry further comprises a shunt capacitor coupled to the control input of the duty cycle control unit; and
a switch to controllably couple an error signal to the shunt capacitor to charge the capacitor, wherein the switch is controlled based on the dimming duty cycle of the dominant LED channel.

14. The electronic circuit of claim 13, wherein:
the switch is controlled so that it is closed during the "on" portion of the dimming duty cycle of the dominant LED channel.

15. The electronic circuit of claim 7, wherein:
the feedback from the DC-DC converter output that is used by the control unit to maintain the output voltage of the DC-DC converter within the narrow range comprises a difference between a current DC-DC converter output voltage and a voltage drop across the LEDs of the dominant LED channel during a most recent "on" period of the dimming duty cycle of the dominant LED channel.

16. The electronic circuit of claim 7, further comprising:
LED dimming logic to provide dimming for the plurality of LED channels, wherein the LED dimming logic is capable of independently controlling a dimming duty cycle and a regulated current level of individual LED channels in the plurality of LED channels.

17. The electronic circuit of claim 16, wherein:
the LED dimming logic is capable of independently controlling an illumination start time of individual LED channels in the plurality of LED channels.

18. The electronic circuit of claim 7, wherein:
the dominant LED channel can vary with time; and
the electronic circuit further comprises a controller to track the identity of the dominant LED channel over time.

19. The electronic circuit of claim 7, further comprising:
a priority queue to track priorities of the LED channels over time, wherein a highest priority LED channel in the priority queue represents the dominant LED channel.

20. The electronic circuit of claim 7, wherein:
the electronic circuit is implemented as an integrated circuit having at least one contact for connection to an external DC-DC converter.

21. A method for use in driving a plurality of LED channels coupled to a common voltage node, each LED channel in the plurality of LED channels including of a series-connected string of LEDs, the method comprising:
generating a duty cycle control signal to set a duty cycle of a DC-DC converter coupled to the common voltage node based on voltage needs of a dominant LED channel in the plurality of LED channels, the duty cycle control signal being applied to an input of a duty cycle control unit; and
maintaining an output voltage of the DC-DC converter within a narrow range during an "off" portion of a dimming duty cycle of the dominant LED channel by alternately enabling and disabling the duty cycle control unit based, at least in part, on feedback from the DC-DC converter output.

22. The method of claim 21, wherein:
alternately enabling and disabling the duty cycle control unit does not affect the duty cycle control signal unit at the input of a duty cycle control unit.

23. The method of claim 21, wherein:
setting the duty cycle of the DC-DC converter is performed during an "on" portion of the dimming duty cycle of the dominant LED channel.

24. The method of claim 23, wherein:
setting the duty cycle of the DC-DC converter includes coupling an error signal to a capacitor during the "on" portion of the dimming duty cycle of the dominant LED channel.

25. The method of claim 23, wherein:
the error signal is generated based on a difference between a feedback voltage from the dominant LED channel and a reference voltage.

26. The method of claim 21, wherein:
maintaining an output voltage of the DC-DC converter within a narrow range includes disabling the duty cycle control unit if the feedback from the DC-DC converter output transitions above an upper threshold voltage and enabling the duty cycle control unit if the feedback from the DC-DC converter output transitions below a lower threshold voltage.

27. The method of claim 21, wherein:
the feedback from the DC-DC converter output comprises a difference between a current DC-DC converter output voltage and a voltage drop across the LEDs of the dominant LED channel during a most recent "on" period of the dimming duty cycle of the dominant LED channel.

* * * * *

UNITED STATES PATENT AND TRADEMARK OFFICE
CERTIFICATE OF CORRECTION

| | | |
|---|---|---|
| PATENT NO. | : 8,957,607 B2 | Page 1 of 1 |
| APPLICATION NO. | : 13/591570 | |
| DATED | : February 17, 2015 | |
| INVENTOR(S) | : Pranav Raval et al. | |

It is certified that error appears in the above-identified patent and that said Letters Patent is hereby corrected as shown below:

In the specification,

Column 2, Line 11 delete "thereof wherein" and replace with --thereof, wherein--.

Column 7, Line 45 delete "open" and replace with --opened--.

Column 8, Line 58 delete "in apparent" and replace with --is apparent--.

Column 10, Line 15 delete "disables," and replace with --disabled,--.

In the claims,

Column 12, Line 10 delete "of a series -" and replace with --a series- --.

Column 12, Line 23 delete "of a series -" and replace with --a series- --.

Column 14, Line 3 delete "of a series -" and replace with --a series- --.

Signed and Sealed this
First Day of March, 2016

Michelle K. Lee
*Director of the United States Patent and Trademark Office*